United States Patent
Shige et al.

(10) Patent No.: US 7,517,599 B2
(45) Date of Patent: Apr. 14, 2009

(54) FUEL CELL SYSTEM

(75) Inventors: Masahiro Shige, Toyota (JP); Tadaichi Matsumoto, Okazaki (JP); Shigeto Kajiwara, Toyota (JP); Hideki Kashiwagi, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 612 days.

(21) Appl. No.: 10/822,837

(22) Filed: Apr. 13, 2004

(65) Prior Publication Data
US 2004/0214054 A1 Oct. 28, 2004

(30) Foreign Application Priority Data
Apr. 22, 2003 (JP) ............... 2003-116526

(51) Int. Cl.
*H01M 8/04* (2006.01)
*H01M 8/12* (2006.01)

(52) U.S. Cl. ............... 429/22; 429/23; 320/101

(58) Field of Classification Search ............... 320/101, 320/104, 138, 140; 318/139, 812; 429/19, 429/23, 180, 13, 22
See application file for complete search history.

(56) References Cited

U.S. PATENT DOCUMENTS

| | | | | |
|---|---|---|---|---|
| 5,929,594 | A * | 7/1999 | Nonobe et al. | 320/104 |
| 6,656,618 | B2 * | 12/2003 | Iwase | 429/23 |
| 2004/0076860 | A1 * | 4/2004 | Aso | 429/23 |
| 2006/0102397 | A1 | 5/2006 | Buck et al. | |

FOREIGN PATENT DOCUMENTS

| | | |
|---|---|---|
| DE | 102 33821 A1 | 2/2004 |
| JP | A-03-223082 | 10/1991 |
| JP | 10319054 A * | 12/1998 |
| JP | A-10-319054 | 12/1998 |
| JP | A 2001-231108 | 8/2001 |
| JP | A-2001-266917 | 9/2001 |
| JP | A-2002-238181 | 8/2002 |
| JP | 2002334712 A * | 11/2002 |
| JP | A 2002-334712 | 11/2002 |

OTHER PUBLICATIONS

An English translation for (JP 2002334712 A), Nov. 2002.*
An English translation for (JP 10319054 A).*

* cited by examiner

*Primary Examiner*—Akm E Ullah
*Assistant Examiner*—Ramy Ramadan
(74) *Attorney, Agent, or Firm*—Oliff & Berridge, PLC (57) ABSTRACT

The measurement precision of a current detector of the fuel cell in a fuel cell system is improved. Where the fuel cell system 20 has not started operation, the vehicle 10 is operating under regenerative operation, the fuel cell 21 is operating under intermittent operation, or operation of the fuel cell system 20 has ended, the output terminal voltage of the fuel cell 21 is set to the OCV value of 400V via the DC/DC converter 31. As a result, even where the status of the fuel cell 21 changes from operating to stopped, the value of the current flowing over the power supply lines 411 can be immediately and reliably set to 0 A. The control unit 60 then obtains the current value Ad from the fuel cell current sensor 413 (step S150), and determines the offset correction value Ac needed in order to cancel the drift amount (i.e., in order to perform zero-point correction).

6 Claims, 5 Drawing Sheets

FUEL CELL SYSTEM

BACKGROUND OF THE INVENTION

1. Field of the Invention

The present invention relates to a fuel cell system that determines the offset correction value for a current detector in a fuel cell, as well as to an offset correction value determination method for a current detector used in a fuel cell system.

2. Description of the Related Art

In general, current sensors have offset current that appears when the input signal is '0', and this offset current fluctuates (drifts) due to secular change. Furthermore, fuel cell current sensors are incorporated in fuel cells that become hot in operation, and because current sensors are used at high temperatures, temperature-induced temperature drift also occurs. The fuel cell power input/output balance accuracy of the fuel cell system as a whole varies widely depending on the performance of the fuel cell's current sensor. For example, while a fuel cell is generating 350 A (amperes) of power, an input/output difference of approximately 1 kW of power exists if there is a sensor error of 3 A, or approximately 1%. Therefore, improvement of the accuracy of the input/output balance of the fuel system as a whole is a critical issue.

As a technology to accurately calculate the power generation target for a fuel cell, a technology has been proposed in which multiple current sensors and voltage sensors are used in order to enable power consumption errors in each device or power consumption errors caused by line resistance to be ignored.

However, in the technology described above, the accuracy of and characteristic fluctuations in the current sensors are not taken into account, and measurement error due to zero-point fluctuation (zero drift) in the current sensors has not yet been eliminated. As a result, discrepancies occur between power generation target values and actual values, thereby preventing improvement of input/output balance accuracy for the fuel cell system as a whole.

SUMMARY OF THE INVENTION

The present invention was created in view of the foregoing, and an object thereof is to improve the measurement accuracy of a fuel cell current detector in a fuel cell system.

In order to resolve at least part of the problem described above, a first aspect of the present invention provides a fuel cell system. The fuel cell system pertaining to the first aspect of the present invention comprises a fuel cell having output terminals, a voltage converter that is connected to the output terminals of the fuel cell, an electrical storage device that is connected in parallel to the fuel cell via the voltage converter and is capable of power charging and discharging, a current detector that detects the current value of the fuel cell, and an offset correction value determination device that determines the offset correction value for the current detector by setting the output terminal voltage of the fuel cell to the open circuit voltage via the voltage converter.

According to the fuel cell system pertaining to the first aspect of the present invention, because the offset correction value for the current detector is determined by setting the output terminal voltage of the fuel cell to the open circuit voltage via the voltage converter, correction of the zero-point fluctuation in the current detector (offset correction) can be accurately performed. Therefore, the measurement accuracy of the current detector of the fuel cell of the fuel cell system can be improved.

In the fuel cell system pertaining to the first aspect of the present invention, the fuel cell system may be mounted in a moving object, the offset correction value determination device may determine the offset correction value by setting the output terminal voltage of the fuel cell to the open circuit voltage during a period that the moving object does not require power generation by the fuel cell. In this case, the offset correction value can be determined without affecting the operation of the moving object.

In the fuel cell system pertaining to the first aspect of the present invention, the period during which power generation by the fuel cell is not required may be at least one of the times before the fuel cell system has started, during regenerative operation of the moving object, during intermittent operation of the fuel cell system and after operation of the fuel cell has stopped. Because these are periods during which power supply from the fuel cell is not needed and are periods that occur at regular intervals during the operation of the moving object, the most recent offset correction values can be obtained at all times.

In the fuel cell system pertaining to the first aspect of the present invention, the fuel cell system may be mounted in a moving object, the offset correction value determination device may determine the offset correction value by setting the output terminal voltage of the fuel cell to the open circuit voltage one of when the temperature of the current detector equals or exceeds a prescribed temperature, when the rate of temperature increase of the current detector equals or exceeds a prescribed rate, or after a prescribed period of time has elapsed since correction of the current detector. In any such case, both temperature drift and drift attributable to the passage of time can be properly corrected.

In the fuel cell system pertaining to the first aspect of the present invention, where the amount of power demanded by the moving object exceeds the amount of power that can be supplied by the electrical storage device, the offset correction value determination device does not set the output terminal voltage of the fuel cell to the open circuit voltage and does not determine the offset correction value. Consequently, the operation of the moving object is not affected.

A second aspect of the present invention provides a fuel cell system. The fuel system in accordance the second aspect of the present invention comprises a fuel cell having output terminals, a current detector that detects the current value of said fuel cell and an offset correction value determination device that determines the offset correction value for said current detector by setting the output terminal voltage of said fuel cell to the open circuit voltage.

According to the fuel cell system pertaining to the second aspect of the present invention, because the offset correction value for the current detector is determined by setting the output terminal voltage of the fuel cell to the open circuit voltage, correction of the zero-point fluctuation in the current detector (offset correction) can be accurately performed. Therefore, the measurement accuracy of the current detector of the fuel cell of the fuel cell system can be improved.

A third aspect of the present invention provides a method of determining offset correction value for the current detector in a fuel cell system that includes an electrical storage device that is connected in parallel to a fuel cell via a voltage converter that is connected to the output terminals of such fuel cell. The method of determining offset correction value for the current detector in a fuel cell system pertaining to the third aspect of the present invention comprises setting the output terminal voltage of the fuel cell to the open circuit voltage via the voltage converter, and determining the offset correction value for the current detector.

According to the method of determining offset correction value for the current detector in a fuel cell system pertaining to the third aspect of the present invention, the same operation and effect as that provided by the fuel cell system pertaining to the first aspect of the present invention can be obtained. Furthermore, the method of determining offset correction value for the current detector in a fuel cell system of the third aspect of the present invention can be realized in various forms, just as with the fuel cell system pertaining to the first aspect of the present invention.

DESCRIPTION OF THE PREFERRED EMBODIMENTS

The fuel cell system and the offset correction value determination method for the current detector in a fuel cell system pertaining to the present invention will be described below with reference to the drawings and based on embodiments thereof.

Figure 1:
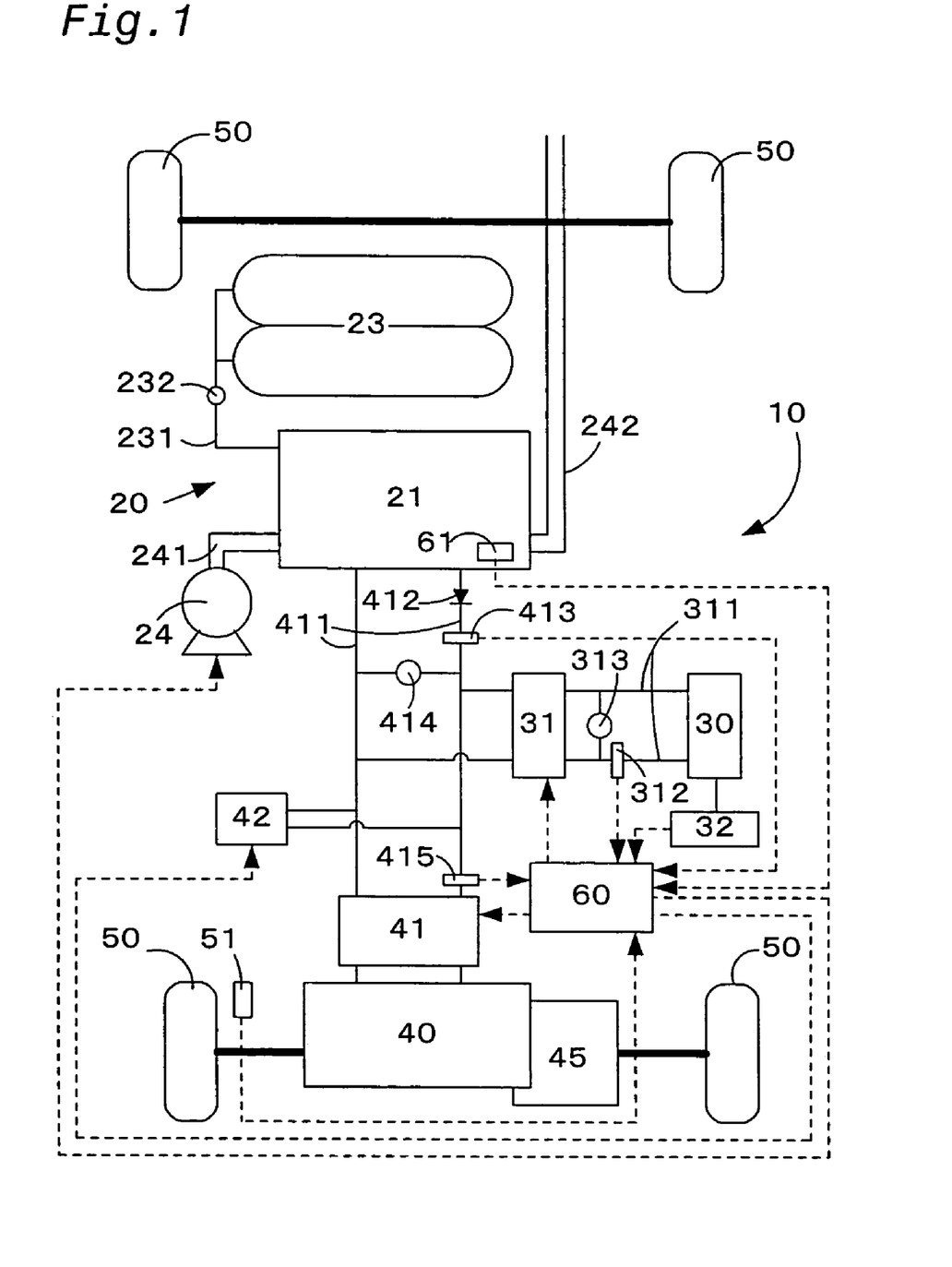
FIG. 1 is an explanatory drawing showing the basic construction of the vehicle in which the fuel cell system pertaining to this embodiment is installed.
Figure 2:
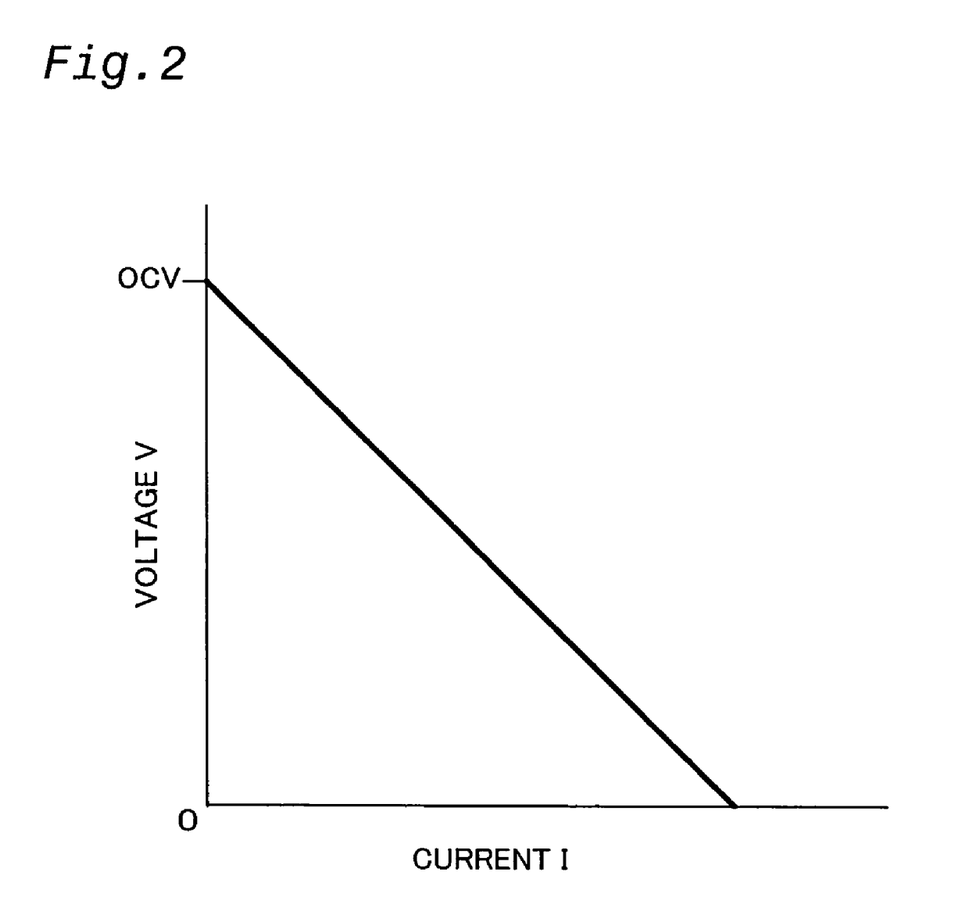
FIG. 2 is an explanatory drawing showing an example of an I-V characteristic map of a fuel cell.

The basic construction and operation of a moving object (vehicle) in which the fuel cell system pertaining to an embodiment of the present invention is installed will now be explained with reference to FIGS. 1 and 2. FIG. 1 is an explanatory drawing showing the basic construction of the vehicle in which the fuel cell system pertaining to the embodiment is installed. FIG. 2 is an explanatory drawing showing an example of an I-V characteristic map of a fuel cell 21.

The fuel cell-equipped vehicle 10 includes a fuel cell system 20 and a secondary battery 30 that comprise a power supply system, a drive motor 40 that converts the power obtained from the fuel cell system 20 and secondary battery 30 into drive power and outputs it, wheels 50 that are driven by the drive motor 40, and a control unit 60 that controls the operation of the vehicle 10. The maximum amount of power supplied in the vehicle of this embodiment is the total amount of power supplied by the fuel cell 21 and the secondary battery 30, and 80% of this total is supplied by the fuel cell 21, while the remaining 20% is supplied by the secondary battery 30, for example.

The fuel cell system 20 includes the fuel cell 21 that consumes hydrogen gas (hydrogen-containing gas) as a fuel and generates electric power, a high-pressure hydrogen tank 23 that stores the hydrogen supplied to the fuel cell 21, and an air pump 24 that supplies air to the fuel cell 21. The fuel cell 21 is a solid macromolecule fuel cell that incorporates a solid macromolecular membrane, for example, and the maximum voltage in this embodiment is approximately 400V.

The fuel cell 21 and high-pressure hydrogen tank 23 are connected by a hydrogen supply tube 231, and a pressure reduction valve 232 that reduces the supply pressure of the hydrogen gas supplied to the fuel cell 21 is disposed in the hydrogen supply tube 231. The fuel cell 21 is connected to the air pump 24 via an air supply tube 241. The air supplied to the fuel cell 21 is expelled into the atmosphere via an exhaust tube.

The fuel cell 21 includes a temperature sensor 61 that detects the temperature thereof. This temperature sensor 61 may be installed directly on the outer wall of the fuel cell 21, or may be installed in either the coolant inlet or the coolant outlet of a heat converter (not shown) used by the fuel cell, or in both the coolant inlet and the coolant outlet.

The drive motor 40 is a three-phase synchronous motor, and includes a rotor that has multiple permanent magnets affixed to its outer wall, as well as a stator around which is wound a three-phase coil to form a rotating magnetic field, for example. The drive motor 40 and fuel cell 21 are connected via an inverter 41 and power supply lines 411. The inverter 41 converts the DC current supplied from the fuel cell 21 into AC current and supplies it to the drive motor 40, as well as controls the operation of the drive motor 40 based on control signals received from a control unit 60. Connected to the power supply lines 411 are a diode 412 that prevents reverse current when the fuel cell 21 is on standby, a fuel cell current sensor 413 that detects the amount of current from the fuel cell 21, and a fuel cell voltage sensor that detects the amount of voltage from the fuel cell 21. In addition, a high-voltage auxiliary motor 42 and motor current sensor 415 are connected to the power supply lines 411.

The drive motor 40 rotates via the interacting operation of the magnetic field from the permanent magnets mounted to the rotor and the magnetic field formed by the three-phase stator coil, thereby outputs the necessary power to the wheels 50 via a gear mechanism 45. Where a request to reduce the vehicle speed (braking request) is issued, the rotor is driven via external force, thereby causing the motor 40 to function as a generator brake that generates electromotive force at either end of the three-phase coil via the interacting operation of the magnetic fields.

The secondary battery 30 is a battery that can store and output power, and is connected in parallel to the power supply lines 411 (the output terminals of the fuel cell 21) via a DC/DC converter (voltage converter) 31. The DC/DC converter 31 increases the voltage of the output from the secondary battery 30 to the drive motor 40 to the required voltage value in accordance with a signal from the control unit 60 when power is supplied from the secondary battery 30 to the drive motor 40. An SOC sensor 32 that detects the remaining battery capacity SOC of the secondary battery 30 is connected thereto. Furthermore, a secondary battery current sensor 312 that detects the level of current issued by the secondary battery 30 and a secondary battery voltage sensor 313 that detects the level of voltage issued by the secondary battery 30 are connected to the power supply line 311 that connects the secondary battery 30 and the DC/DC converter 31.

The vehicle 10 also includes a switch (ignition switch) 51 that starts and stops the vehicle 10 when it is being driven and parked, respectively.

The control unit 60 includes a central processing unit (CPU), memory device (RAM, ROM) and the like, which are not shown, and controls the operation of the vehicle 10 in accordance with the manner in which it is being driven. The control unit 60 can function as an offset correction determination device. Input to the control unit 60 are the current values detected by the current sensors 413, 312 and 415, the SOC value detected by the SOC sensor 32, ignition position signals indicating the ignition position of the switch 51, and the temperature value detected by the temperature sensor 61. The control unit 60 uses the value, as the current value of the fuel cell 21, which is obtained by performing zero-point correction of the measurement value detected by the fuel cell current sensor 413 using the offset correction value sought via the processing described below. The control unit 60 is connected to the air pump 24, the DC/DC converter 31, the inverter 41 and the high-voltage auxiliary motor 42 via a control signal line, and controls the driving status of the vehicle 10 by outputting control signals to these various components.

The basic operation of the vehicle 10 having the above construction will be summarized below. The control unit 60 determines the necessary power supply amount in accordance with the demand that is input from an acceleration sensor not shown. Where the secondary battery 30 is charged via the power generated by the fuel cell 21, the necessary supply power amount comprises the sum of the amount of the supply power corresponding to the demand input and the amount of power to be accumulated in the secondary battery 30.

The control unit 60 determines the burden ratio by which the determined supply power amount is apportioned to the fuel cell 21 and the secondary battery 30. The burden ratio is determined with reference to the SOC value detected by the SOC sensor 32, for example, and where the SOC value is low (indicating a small battery capacity), the entire necessary supply power amount is supplied by the fuel cell 21, while where the SOC value is high (indicating a large battery capacity), power is supplied by the fuel cell 21 and the secondary battery 30, or the secondary battery 30 alone, in accordance with the necessary supply power amount.

The control of the amount of power supplied for the fuel cell 21 by the control unit 60 (i.e., the power generation amount) is carried out via drive control of the air pump 24 using the detection values from the fuel cell current sensor 413 and the fuel cell voltage sensor 414. The output voltage from the fuel cell 21 (i.e., the output terminal voltage) is adjusted by the DC/DC converter 31. In this regard, the relationship shown in FIG. 2 between the voltage V and current I of the fuel cell 21 is known to exist. Therefore, cessation of the power supply from the fuel cell 21 (the state in which the current traveling on the power supply line 414=0 A), for example, is realized by setting the output terminal voltage of the fuel cell 21 to the OCV (open circuit voltage) value of 400V via the DC/DC converter 31, even where the operation of the fuel cell 21 is not stopped. In this embodiment, because a diode 412 is placed on the power supply line 414, the flow of reverse current from the power supply lines 411 to the fuel cell 21 is prevented even where the output terminal voltage of the fuel cell 21 is set to the OCV value.

Where power is supplied by both the fuel cell 21 and the secondary battery 30, the secondary battery 30 voltage value is increased up to the output terminal voltage value for the fuel cell 21 by the DC/DC converter 31. Where the demanded power is less than the amount of power that can be supplied by the secondary battery 30, the control unit 60 stops the operation of the fuel cell 21 (intermittent operation) and supplies the entire power amount from the secondary battery 30. The basic operation of the vehicle 10 described above (the operation of the fuel cell 21 and the secondary battery 30) represents only an example thereof, and may naturally change in accordance with the object thereof and the various conditions governing such operation.

The (DC) power supplied by the fuel cell 21 and/or the secondary battery 30 is supplied to the inverter 41 via the power supply lines 411, and the control unit 60 causes the demanded drive power to be output to the wheels 50 by executing drive control of the drive motor 40 via the inverter 40.

Figure 3:
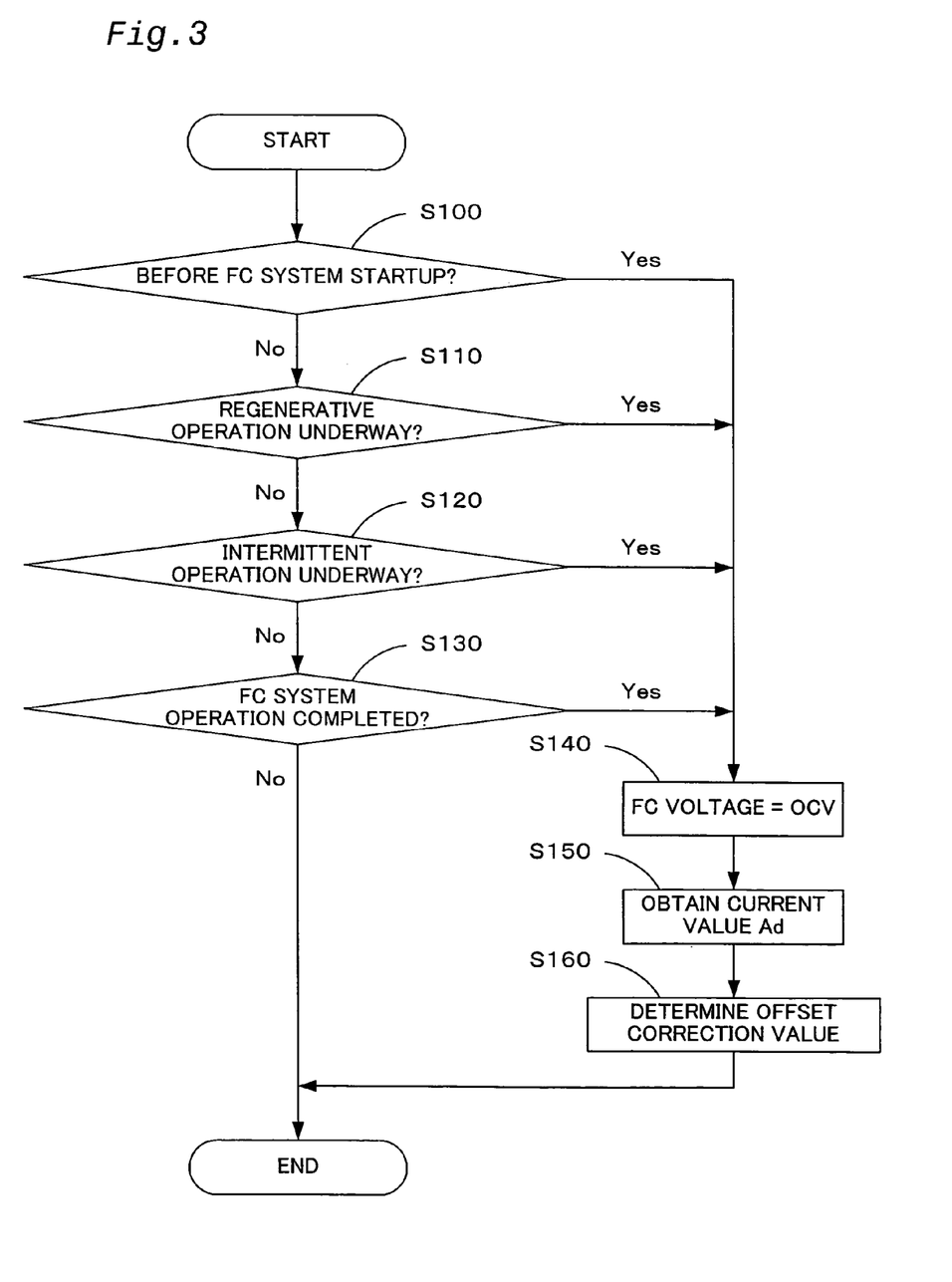
FIG. 3 is a flow chart showing the offset correction value determination processing routine that is executed by the fuel cell current sensor 413 at prescribed intervals in the fuel cell-equipped vehicle 10 pertaining to the embodiment.
Figure 4:
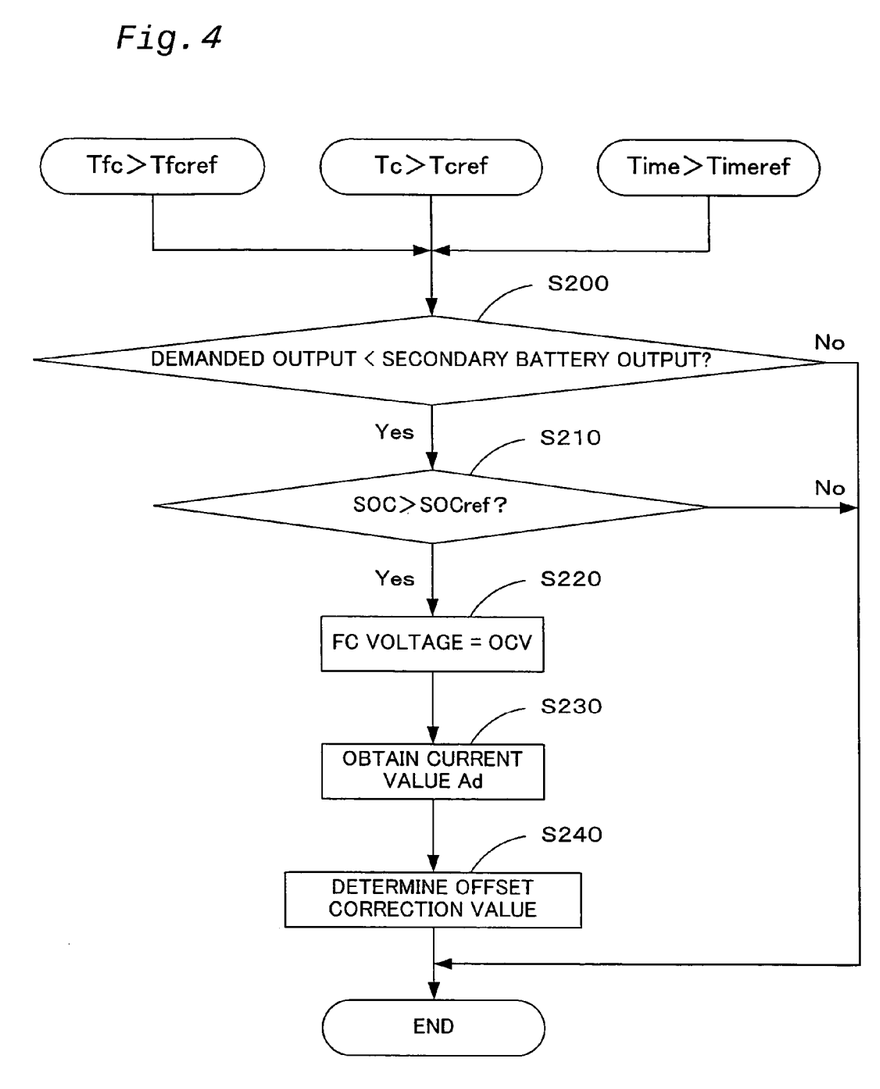
FIG. 4 is a flow chart showing the fuel cell current sensor 413 offset correction value determination processing routine that is executed when [any of] prescribed conditions occur in the fuel cell-equipped vehicle 10 pertaining to the embodiment.
Figure 5:
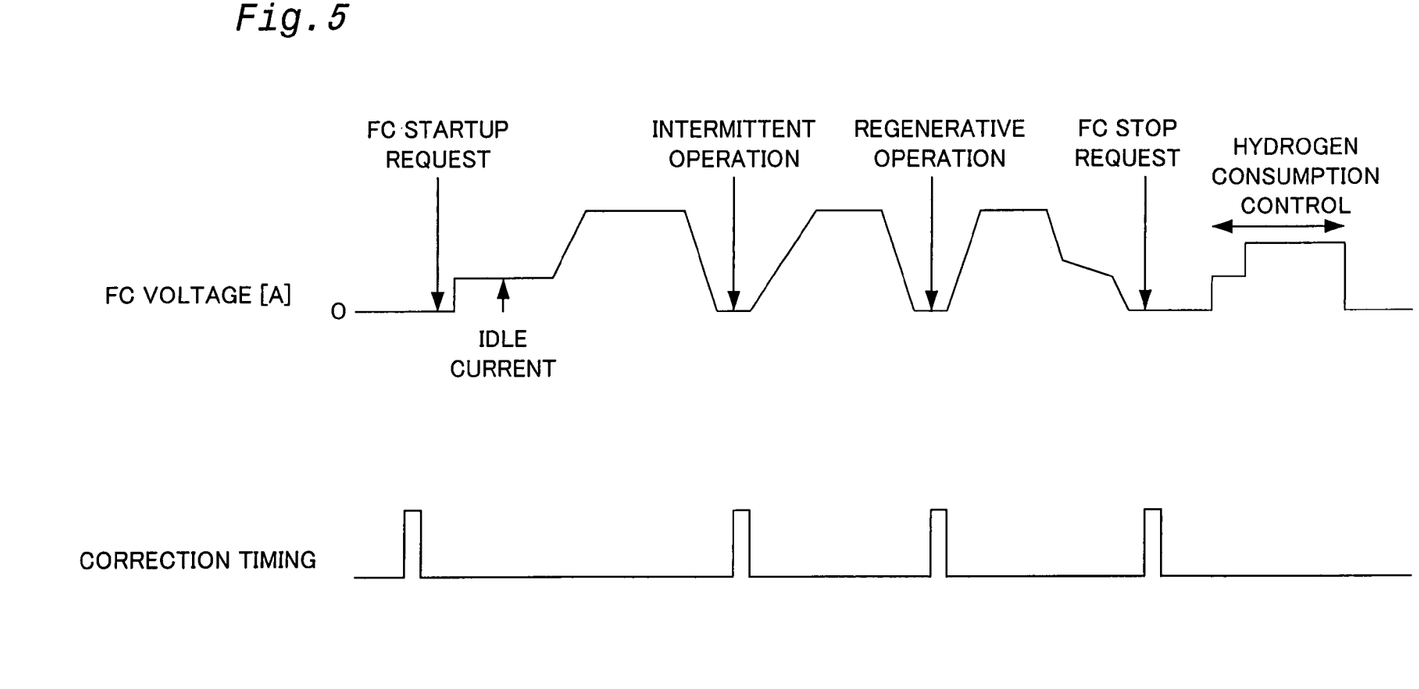
FIG. 5 is an explanatory drawing showing the operational status of the fuel cell 21 and the timing of the fuel cell current sensor 413 offset correction.

The offset correction value determination process carried out by the fuel cell current sensor 413 of the fuel cell system-equipped vehicle 10 pertaining to this embodiment will now be described with reference to FIGS. 3-5. FIG. 3 is a flow chart showing the offset correction value determination processing routine that is executed by the fuel cell current sensor 413 at prescribed intervals in the fuel cell-equipped vehicle 10 pertaining to this embodiment. FIG. 4 is a flow chart showing the offset correction value determination processing routine that is executed by the fuel cell current sensor 413 when [any of] prescribed conditions occurs in the fuel cell-equipped vehicle 10 pertaining to this embodiment. FIG. 5 is an explanatory drawing showing the operational status of the fuel cell 21 and the timing of the offset correction performed by the fuel cell current sensor 413.

First, the offset correction value determination process shown in FIG. 3 and performed periodically at prescribed intervals will be described. This offset correction value determination process is executed during periods in which power supply from the fuel cell 21 is not necessary, as shown in FIG. 5. Specifically, it is executed before a request for startup of the fuel cell 21 has been issued (i.e., before the fuel cell system 20 has started operation), during intermittent operation of the fuel cell 21, during regenerative operation, or after a request for cessation of operation of the fuel cell 21 has been issued (i.e., after the operation of the fuel cell system 20 has stopped).

This processing routine is executed repeatedly at prescribed time intervals. The control unit 60 determines whether or not the fuel cell system 20 has started operation (step S100). Specifically, it is determined whether the user (operator) has not set the switch 51 to ON, or whether it is not in the start position. If the control unit determines that the fuel cell system 20 has started (NO in step S100), it determines whether the vehicle 10 is operating under regenerative operation (step S110).

The determination regarding whether the vehicle 10 is operating under regenerative operation is made based on whether or not a flag indicating that regenerative operation is underway is ON, for example. The determination as to whether or not to begin regenerative operation is made based on such factors as whether the degree of pressure on the accelerator is '0', whether the brake pedal is being pressed or whether power can be stored in the secondary battery 30 (i.e., whether the SOC value is small). Where it is determined that the vehicle 10 is not operating under regenerative operation (NO in step S110), the control unit 60 determines whether the fuel cell 21 is operating under intermittent operation (step S120).

The determination regarding whether the fuel cell 21 is operating under intermittent operation is made based on whether or not a flag indicating that intermittent operation is underway is ON, for example. Intermittent operation (standby operation) of the fuel cell 21 is carried out where the demand for output to the vehicle 10 is low, and the amount of power needed to supply the demanded output can be provided solely from the secondary battery 10. It is also carried out where the vehicle 10 is stopped, such as when it is waiting for a traffic signal, there is no need to drive the drive motor 40, and the high-voltage auxiliary motor 42 can be driven solely by the secondary battery 30.

Where it is determined that the fuel cell 21 is not operating under intermittent operation (NO in step S120), the control unit 60 determines whether or not operation of the fuel cell system 20 has ended (step S130). Specifically, it is determined whether or not the user (the operator) has turned OFF the switch 51. In the fuel cell system 20 pertaining to this embodiment, after the fuel cell system 20 has stopped operating, hydrogen consumption control is executed in order to consume the hydrogen remaining in the fuel cell 21. In this hydrogen consumption control, a higher degree of precision in control is required in order to control the generation of power using only the remaining hydrogen, and the output current value is limited to 20 A or less. At the same time, because the offset of the fuel cell current sensor 413 is approximately 18 A, offset correction is required when the fuel cell system 20 ceases operation.

Where it is determined that operation of the fuel cell system 20 has not ended (NO in step S130), the control unit 60 ends the processing routine because under the various conditions described above, the operation of the fuel cell 21 is not stopped and the current value of the current flowing through the fuel cell current sensor 413 cannot be made '0'.

If it is determined, on the other hand, that the fuel cell system 20 has not started operation (YES in step S100), that the vehicle 10 is operating under regenerative operation (YES in step S110), that the fuel cell 21 is operating under intermittent operation (YES in step S120), or that operation of the fuel cell system 20 has ended (YES in step S130), the output terminal voltage of the fuel cell 21 is set to the OCV value of 400V via the DC/DC converter 31. As a result, even where the status of the fuel cell 21 changes from operating to stopped, the value of the current flowing over the power supply lines 411 can be immediately and reliably set to 0 A.

The control unit 60 then obtains the current value Ad from the fuel cell current sensor 413 (step S150), and determines the offset correction value Ac needed in order to cancel the drift amount (i.e., in order to perform zero-point correction) using the following equation 1:

Offset correction value Ac=Ad    (Equation 1)

The determination of the offset correction value Ac is carried out by sampling the current value Ad at 2 msec intervals and calculating the average value of the offset correction values Ac obtained during each sampling. The determined offset correction value Ac is stored in a memory device such as a RAM such that the most recent value is retained. During the next operation of the fuel cell system 20, the control unit 60 performs zero-point correction using the most recent offset correction value Ac. Specifically, the control unit 60 corrects the actual current value by applying the most recent offset correction value Ac to the measurement value obtained from the fuel cell current sensor 413, and controls the operation of the fuel cell 21 based on the correct fuel cell current value.

The process of determining the offset correction value for the fuel cell current sensor 413, which is executed when prescribed conditions occur, will be described below with reference to FIG. 4. This correction value determination process differs from the correction value determination process described above in that the process is compulsorily carried out regardless of the state of operation of the fuel cell 21 where there is a high probability of temperature drift in the fuel cell current sensor 413 or a prescribed period of time has elapsed since the most recent periodic correction value determination process.

Where the fuel cell 21 temperature Tfc becomes higher than a prescribed temperature Tfcref, the rate of temperature increase of the fuel cell current sensor 413 becomes higher than a prescribed rate of increase Tcref, or the elapsed time Time since the previous correction value determination process exceeds a prescribed time Timeref, this processing routine is begun. The temperature of the fuel cell 21 is detected by the temperature sensor 61, and because the fuel cell current sensor 413 is disposed on the outer wall of the fuel cell 21 or adjacent thereto, the rate of temperature increase of the fuel cell current sensor 413 is also calculated based on the detection value obtained by the temperature sensor 61. Naturally, it is acceptable if the temperature of the fuel cell current sensor 413 is detected instead of the temperature of the fuel cell 21, or if the rate of temperature increase of the fuel cell 21 is detected instead of the rate of temperature increase of the fuel cell current sensor 413. In any case, it is acceptable if the change in temperature of the fuel cell current sensor 413 can be detected.

This processing routine is executed in the form of an interrupt to the normal fuel cell operation routine. When the processing routine is begun, the control unit 60 determines whether or not the output demanded by the vehicle 10 is an output value that can be output by the secondary battery 30 (step S200). Specifically, in this embodiment, it is determined whether or not the amount of power needed to output the demanded output to the drive motor 40 is 20% or less of the maximum supply power amount. Because where the output demanded by the vehicle 10 exceeds the output value that can be output by the secondary battery 30, the amount of output decreases when the power supplied from the fuel cell 21 stops and the drivability is hindered, this determination is made in order to avoid having to perform the correction process for the fuel cell current sensor 413 under this condition.

Where it is determined that the output demanded by the vehicle 10 is the output value that can be output by the secondary battery 30 (YES in step S210), the control unit 60 determines whether or not the SOC value is larger than a prescribed value SOCref (step S220). In other words, it determines whether or not the secondary battery 30 is actually in a state in which it can supply power.

Where it is determined that the SOC value is larger than the prescribed value SOCref (YES in step S210), the control unit 60 sets the output terminal voltage of the fuel cell 21 to the OCV value of 400V via the DC/DC converter 31 (step S230). As a result, even where the fuel cell 21 is operating, the value of the current flowing in the power supply lines 411 is immediately deemed 0 A and correction of the fuel cell current sensor 413 can be carried out.

The control unit 60 then obtains the current value Ad from the fuel cell current sensor 413 (step S240) and determines the offset correction value Ac required for zero-point correction (step S250), whereupon the processing routine ends. Because this offset correction value Ac determination process is identical to the processing of steps S150 and S160 described with reference to FIG. 3, a detailed description thereof will be omitted.

As described above, according to the vehicle 10 in which the fuel cell system pertaining to this embodiment is installed, because the offset correction value for the fuel cell current sensor 413 is determined after the fuel cell 21 output terminal voltage is set to the OCV value and the value of the current flowing to the fuel cell current sensor 413 is reliably deemed to be 0 A, zero-point correction (offset correction) of the fuel cell current sensor 413 can be accurately performed. Therefore, the measurement precision of the fuel cell current sensor 413 can be improved, and the power input/output balance accuracy of the fuel cell system as a whole can be improved accordingly. For example, where the fuel cell 21 outputs a voltage of 300V, a 10 A measurement error would result in a power loss of 6 kw, but this power loss can be prevented (i.e., fuel consumption improved) in this embodiment.

According to this embodiment, because offset correction of the fuel cell current sensor 413 is performed repeatedly at the proper timings where the fuel cell 21 is not supplying power, the most recent offset correction value can always be obtained in response to the continuously fluctuating drift amount. Therefore, the measurement precision of the fuel cell current sensor 413 can always be maintained at a high level, and the power input/output balance accuracy of the entire fuel cell system can be maintained at a high level as well.

According to this embodiment, under conditions that easily result in temperature drift, offset correction processing is carried out in order to determine an offset correction value for the fuel sensor current sensor 413 regardless of the operational status of the fuel cell 21. Because temperature drift brings about a larger amount of drift than drift attributable to secular change, it has a substantial effect on power input/output balance for the fuel cell system as a whole. However, because this embodiment enables zero-point fluctuation (zero drift) that accompanies temperature drift to be properly corrected, the measurement accuracy of the fuel cell current sensor 413 can be maintained at a high level regardless of temperature drift, and the power input/output balance accuracy of the entire fuel cell system can be maintained at a high level as well.

Because this embodiment enables an offset correction value to be obtained that compensates for temperature drift, which has a substantial impact, even where the fuel cell system 20 has stopped operating without the use of the switch 51, hydrogen consumption can be controlled with a high degree of precision. While the offset correction process carried out for the fuel cell current sensor 413 using the periodic processing routine shown in FIG. 3 is executed where the operation of the fuel cell system 20 has been stopped using the switch 51, it is not executed where the operation of the fuel cell system 20 has been stopped using a mechanism other than the switch 51. Here, it is preferred that the hydrogen consumption control carried out by the fuel cell system 20 be executed in any event after operation of the fuel cell system 20 has stopped. Therefore, by carrying out offset correction under conditions in which temperature drift is likely to occur, hydrogen consumption can be controlled with a high level of precision regardless of the manner in which operation of the fuel cell system 20 is stopped.

Other Embodiments

In the above embodiment, a secondary battery 30 is used, but charge accumulating means such as a capacitor may be used instead, for example, because in such a case, power charging and discharge can be carried out in the same manner as described above.

In the above embodiment, the temperature of the fuel cell 21 is detected using a temperature sensor 61 mounted directly on the fuel cell 21, but a temperature sensor that measures the temperature of the coolant that cools the fuel cell 21 may be used instead. Alternatively, the temperature of the fuel cell 21 may be measured by measuring the temperature of the atmosphere and associating such temperature with the temperature of the fuel cell 21 in advance.

In the above embodiment, hydrogen stored in a high-pressure hydrogen tank 23 is used as the fuel for the fuel cell 21, but gas that contains hydrogen (reformulated gas) obtained from a reformer may be used as well.

Furthermore, the devices and methods pertaining to the above embodiment may also be realized as a computer program or recording medium (electrical, magnetic or optical recording medium) on which such computer program is recorded.

While the above embodiment was described with reference to offset correction of the fuel cell current sensor 413, it may also be realized in the same manner through offset correction of the motor current sensor 415. In this case, control of the motor 40 can be executed based on a highly accurate current value.

While the fuel cell system and offset correction value determination method for the current detector of such fuel cell system were described based on several embodiments, the embodiments described above are merely examples, and the present invention is not limited thereto. The present invention may be changed or improved within the scope of the essence thereof and the claims pertaining thereto, and naturally incorporates all equivalent systems and methods.

What is claimed is:

1. A fuel cell system comprising:
   a fuel cell having output terminals;
   a voltage converter that is connected to said output terminals of said fuel cell;
   an electrical storage device that is connected in parallel to said fuel cell via said voltage converter and is capable of power charging and discharging;
   a current detector that detects a current value of said fuel cell; and
   a current offset correction value determination device that determines a current offset correction value for said current detector by setting an output terminal voltage of said fuel cell to an open circuit voltage via said voltage converter, wherein
   said fuel cell system is mounted in a moving object, said current offset correction value determination device determines said current offset correction value by setting the output terminal voltage of said fuel cell to the open circuit voltage during a period that the moving object does not require power generation by said fuel cell.

2. A fuel cell system according to claim 1, wherein said period that power generation by said fuel cell is not required is at least one of the following periods: before the fuel cell system has started, during regenerative operation of the moving object, during intermittent operation of the fuel cell system and after operation of the fuel cell has stopped.

3. A fuel cell system according to claim 1, wherein said fuel cell system is mounted in a moving object, and said current offset correction value determination device determines said current offset correction value by setting the output terminal voltage of said fuel cell to the open circuit voltage when a temperature of said current detector equals or exceeds a prescribed temperature, when a rate of temperature increase of said current detector equals or exceeds a prescribed rate, or after a prescribed period of time has elapsed since a correction of said current detector.

4. A fuel cell system according to claim 3, wherein when an amount of power demanded by said moving object exceeds an amount of power that can be supplied by said electrical storage device, said current offset correction value determination device does not set the output terminal voltage of said fuel cell to the open circuit voltage and does not determine the current offset correction value.

5. A fuel cell system comprising:
   a fuel cell having output terminals;
   a current detector that detects a current value of said fuel cell; and
   a current offset correction value determination device that determines a current offset correction value for said current detector by setting an output terminal voltage of said fuel cell to an open circuit voltage, wherein said fuel cell system is mounted in a moving object, said current offset correction value determination device determines said current offset correction value by setting the output terminal voltage of said fuel cell to the open circuit voltage during a period that the moving object does not require power generation by said fuel cell.

6. A method of determining a current offset correction value for a current detector in a fuel cell system including an electrical storage device that is connected in parallel to a fuel cell via a voltage converter, wherein the voltage converter is connected to output terminals of such fuel cell, the method comprising:

setting an output terminal voltage of said fuel cell to an open circuit voltage via said voltage converter; and determining the current offset correction value for said current detector, wherein the fuel cell system is mounted in a moving object and the current offset correction value is determined by setting the output terminal voltage of said fuel cell to the open circuit voltage during a period that the moving object does not require power generation by said fuel cell.

* * * * *